United States Patent [19]

Scragg et al.

[11] 3,998,205
[45] Dec. 21, 1976

[54] SOLAR REACTOR STEAM GENERATOR METHOD AND APPARATUS

[76] Inventors: Robert L. Scragg; Alfred B. Parker, both of 2937 SW. 27th Ave., Miami, Fla. 33133

[22] Filed: Apr. 1, 1975

[21] Appl. No.: 564,087

[52] U.S. Cl. .................................. 126/271; 60/641
[51] Int. Cl.² .......................................... F24J 3/02
[58] Field of Search .......... 126/270, 271; 237/1 A; 290/2; 60/641; 62/2; 136/89

[56] References Cited
UNITED STATES PATENTS 3,070,703   12/1962   Podolny .......................... 126/270

*Primary Examiner*—Kenneth W. Sprague
*Assistant Examiner*—James C. Yeung
*Attorney, Agent, or Firm*—Cushman, Darby & Cushman

[57] ABSTRACT

A solar reactor steam generator is disclosed which includes a concrete housing with reactor chamber, tubular heat exchanger, solar sight glass, and solar intensifier. In one embodiment, the reactor chamber is cylindrical. Inside the chamber is a heat exchanger which consists of a single pass helical tube stack which absorbs and conducts convective, conductive, and radiated heats of reactions to liquids or vapors inside the tube. A solar intensifier, such as a parabolic reflector, is mounted on top of the reactor housing. It collects and intensifies solar rays, then guides them down through a solar sight glass, mounted in top of the housing, into the reactor chamber, onto a reflector cone which disperses solar rays throughout the chamber. Hydrogen, chlorine, and atmospheric oxygen are piped into the reactor chamber via tubing. The hydrogen and chlorine react with controlled explosive violence when exposed to the solar rays. It should be understood that high intensity lamps can be used in the absence of solar rays. In another embodiment of this invention, carbonaceous blocks with single pass tube configurations are used in a rectangular reactor chamber.

16 Claims, 3 Drawing Figures

SOLAR REACTOR STEAM GENERATOR METHOD AND APPARATUS

BACKGROUND OF INVENTION

This invention relates to reactors and boilers and more specifically to solar reactors and boilers utilizing tungsten carbide tubing and silicon carbide blocks with tube configurations as mediums for absorbing conductive, convective, and compression heats, and infrared radiation; and utilizes gaseous or liquid hydrogen and chlorine as reactants.

In the process of generating steam for power turbines or for other processes, two basic methods are used to produce heat for generating steam. One is external or atmospheric combustion of fossil fuels which conducts and convects heats of combustion around or through fire or water tube boilers. A second method is the internal reaction of nuclear radiation which radiates, conducts, and convects radiated heat into exchange mediums that conduct and convect the heats to water tube or vessel boilers. Both of these systems have several factors in common when used as primary heat sources in large utility power generation, i.e., they can't be turned on and off, cooled or heated on a cyclic basis to meet consumer load demands placed on utilities. Therefore, they generate a surplus of power during low demand periods, i.e., from 10:00 P.M. to 6:00 A.M., and do not generate enough power during high demand periods such as from 6:00 A.M. to 10:00 P.M. Both of these systems are restricted to utilizing only conducted and convected heats directly to the heated tube or vessel exchange mediums. In addition, both of these systems are hazardous to the environment and are limited in efficiency due to the heat exchange mediums available sources of combustion and radiation known in the art.

It therefore is an object of this invention to provide a method for generating steam for power turbines during daylight high load demand periods.

It is another object of this invention to provide a method of utilizing fuels and reactants which can be produced by electrolysis cells during nighttime low load demand periods.

It is another object of this invention to provide a method for utilizing conductive, convective, radiated, and compressive heats directly as heat exchange mediums.

It is another object of this invention to provide a method of generating steam that is non-hazardous to the environment.

It is another object of this invention to provide a method of generating steam more efficiently.

It is another object of this invention to provide a method of converting electrical power into fuels and/or reactants and then storing same.

It is another object of this invention to provide a method of utilizing stored fuels and/or reactants to generate steam when load demands are high.

SHORT STATEMENT OF INVENTION

Accordingly, this invention relates to a solar reactor steam generator method and apparatus and its application in the electrical power generating process and includes a method of producing fuels and/or reactants for the solar reactor. An electrical power generator provides AC power to a power rectifier which thereby produces direct current. The direct current powers a chlorine-sodium hydroxide electrolysis cell. Hydrogen produced by the cell is compressed and stored until needed. Chlorine produced by the cell is compressed and also stored until needed. Sodium hydroxide and sodium chloride produced by the cell are used for suitable processes as desired. During daylight hours, solar rays are received by a parabolic reflector or other suitable focusing means which is controlled by an automated azimuth tracker. The parabolic reflector concentrates the solar rays into an intense focal point reflector whih reflects the intense solar beam via a series of reflectors, through a solar sight glass into the reactor chamber, and onto the surface of a conical reflector at the base of the chamber which disperses the solar rays throughout the chamber. Hydrogen and chlorine from the storage tanks are fed into the solar reactor chamber, which is cylindrical and contains a helical tube stack pressed against the chamber wall. Water is fed into the base port of the tube stack. The hydrogen and chlorine react with controlled explosive violence when exposed to intensified solar rays thereby producing intense heat within the chamber. The heat vaporizes the water in the tube stack, producing steam at the top tube port. The steam is fed to the power turbine where it is used in the power generating process.

In another embodiment of this invention, a rectangular reactor chamber is provided with carbonaceous blocks containing a fluid conducting tube therein. In this embodiment a pyramid reflector at the base of the chamber is utilized.

BRIEF DESCRIPTION OF THE DRAWINGS

Other objects, features and advantages of the invention will become more fully understood from the following detailed description of the preferred embodiment, the appended claims and the accompanying drawings in which:

DETAILED DESCRIPTION OF THE EMBODIMENTS

Throughout the detailed description of the embodiments of the present invention, like numerals will correspond to like elements in the figures.

Figure 1:
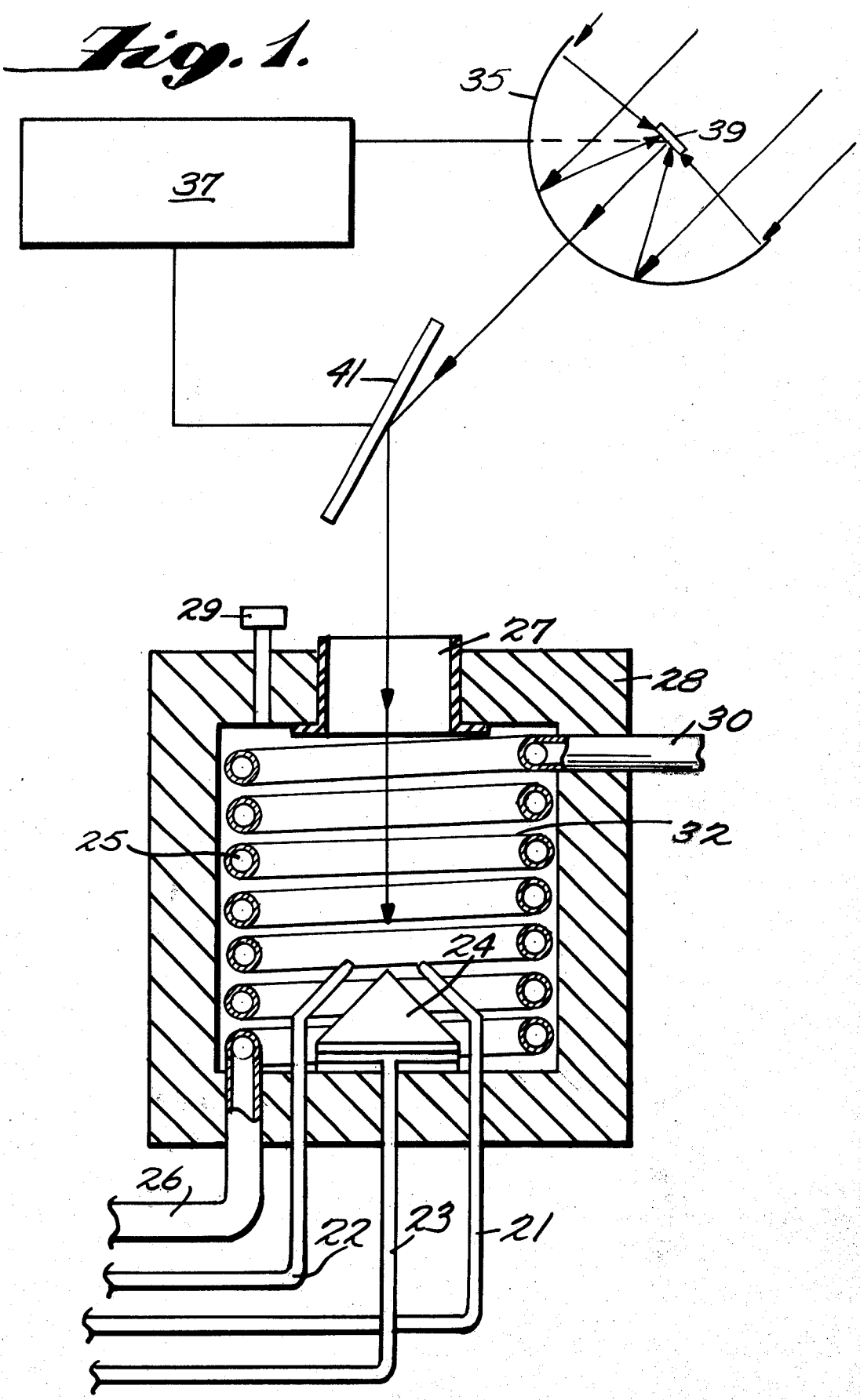
FIG. 1 is a section view taken in elevation of one embodiment of the solar reactor steam generator.

Refer now to FIG. 1 where there is disclosed a section view of the one embodiment of the solar reactor steam generator. Fuel and/or reactants are fed into the solar reactor chamber 32 via tubes 21 and 22. In the preferred embodiment chlorine is fed into the reactor via tube 22 and hydrogen via tube 21 at controlled rates. Atmospheric oxygen is fed into the cylindrical chamber 32 via tube 23 under the base of conical reflector 24. Water is fed into the exchanger tubing 25 via tube 26. Solar rays are concentrated and intensified by an azimuth tracking parabolic reflector system such as is well known in the art. Solar radiation is received by a parabolic reflector 35 which tracks the sun by means of a conventional azimuth tracker 37. The parabolic reflector concentrates the solar rays into a focal point reflector 39 which reflects the intense solar beam via reflector 41 through the solar sight glass 27. The intensified solar rays are directed downward through solar sight glass 27, which is encased within the reactor chamber wall 28, and onto the surface of conical reflector 24, which disperses the intense solar rays onto the surface of the exchanger tubing 25. Hydrogen and chlorine gas emitted into the chamber 32 via tubes 21 and 22, respectively, react with controlled explosive violence creating intense heat and pressure within the chamber 32. Pressure relief valve 29, shown schematically, release excessive pressure in chamber 32. Heat in the chamber 32 is transferred and absorbed in exchanger tube 25 by conductive, convective, compressive, and infrared radiation, thereby vaporizing the water in the tube 25. The vaporized water is exhausted into tube 30 for utilization in a manner to be described more fully hereinbelow.

Figure 2:
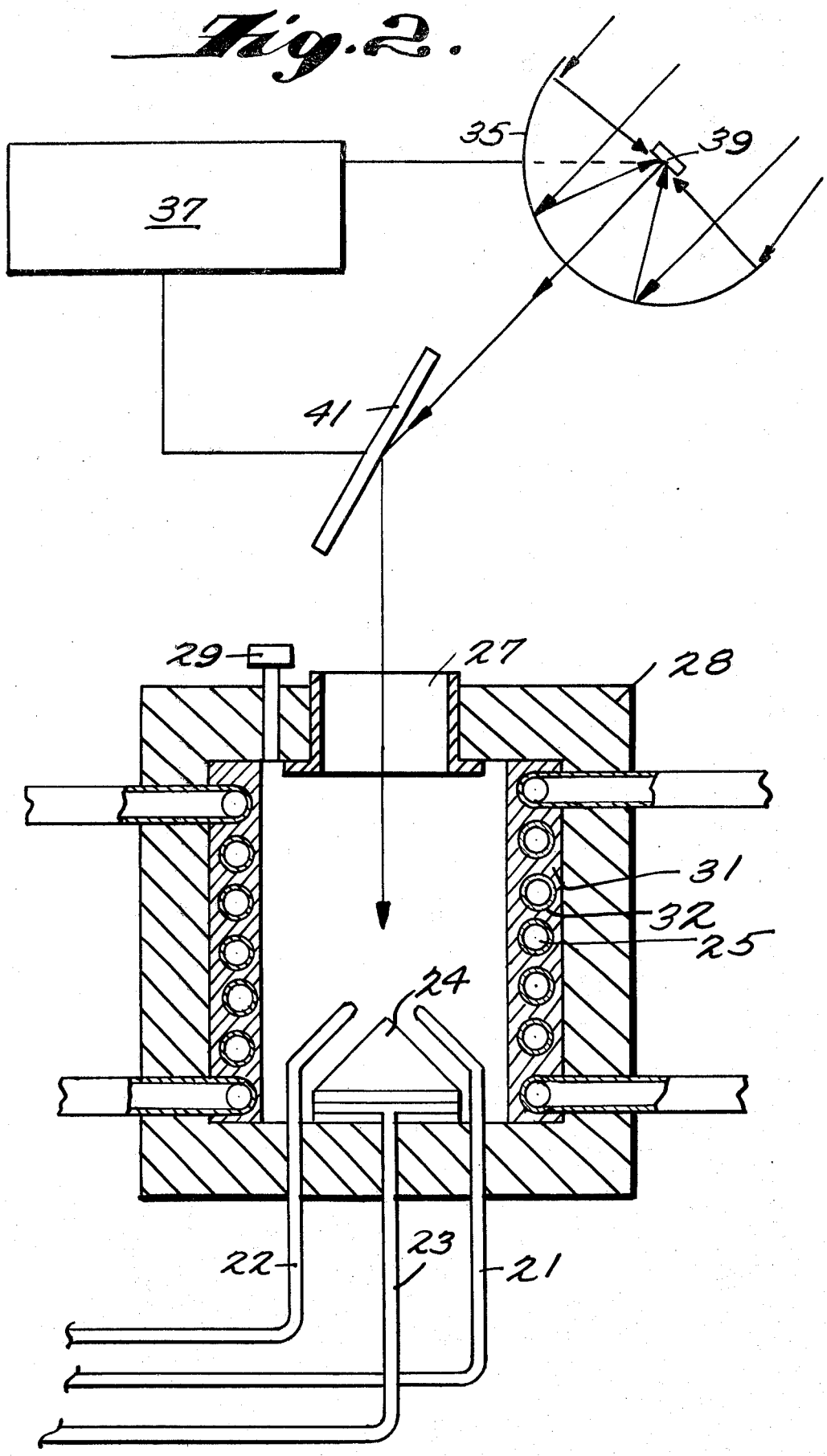
FIG. 2 is a section view taken in elevation of another embodiment of the solar reactor steam generator.

Refer now to FIG. 2 where there is disclosed an alternate embodiment of the solar reactor steam generator. In this embodiment, exchanger tubes 25 are enclosed in silicon carbide blocks 31 which are mounted flush to the walls of rectangular chamber 32. The use of silicon carbide to generate steam is more fully disclosed in copending U.S. patent application Ser. No. 534,588, filed Dec. 19, 1974 by the same inventors herewith. The subject of that application is hereby incorporated herein.

Figure 3:
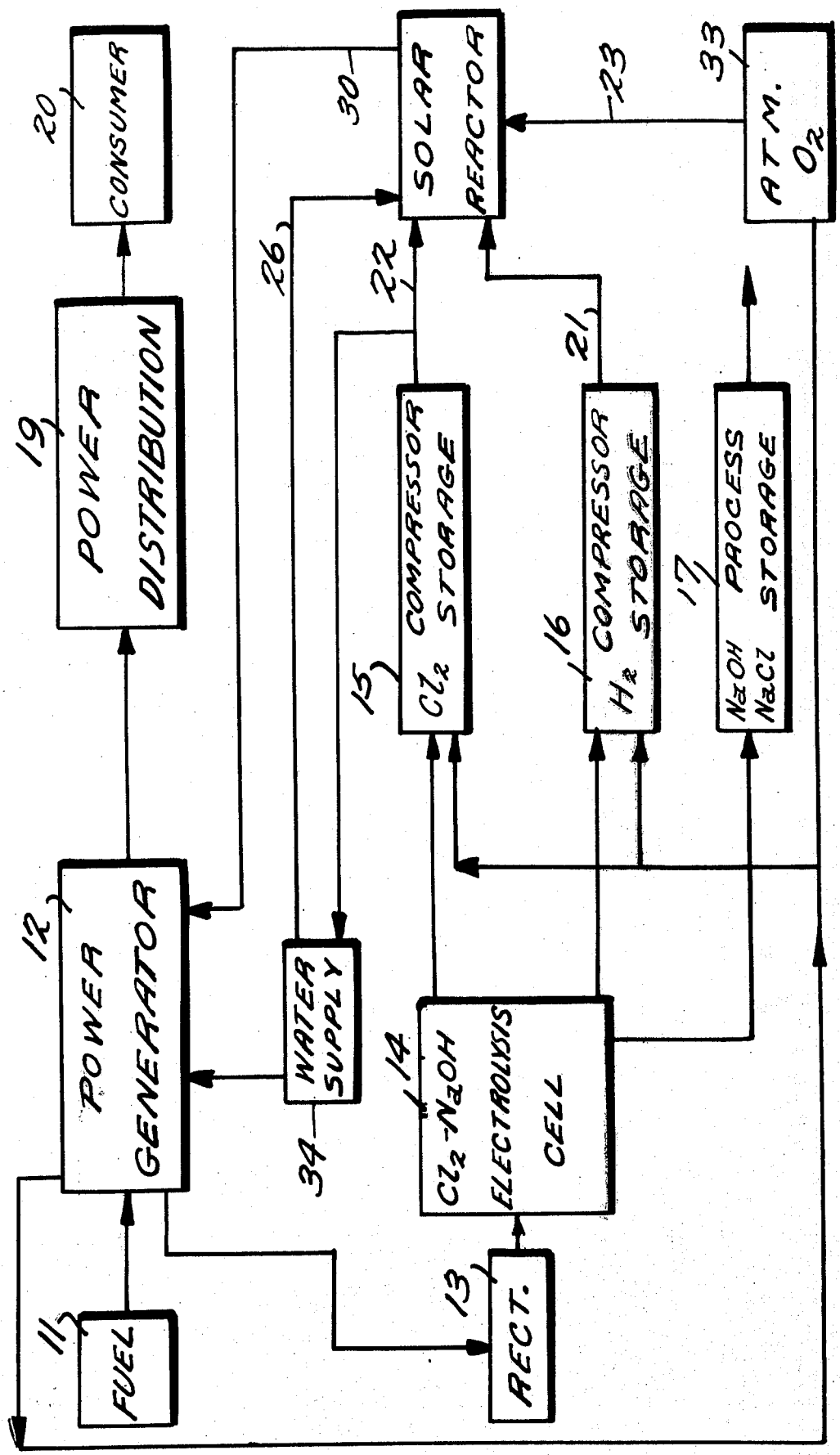
FIG. 3 is a block diagram of the solar reactor steam generator illustrating the reactant producing process.

Refer now to FIG. 3 where there is disclosed block diagram of fuel source 11, a power generator 12, a distribution system 19, a utilization means 20, a method of generating fuel and/or reactants via a power rectifier circuit 13, a chlorine-sodium hydroxide electrolysis cell 14, a chlorine compressor storage tank 15, a hydrogen compressor storage tank 16, a sodium hydroxide and sodium chloride process and storage tank 17, and the solar reactor steam generator 32 illustrated in FIGS. 1 and 2.

In operation a supply voltage from the alternating current power source 12 is fed to the power rectifier circuit 13. The power rectifier circuit 13 includes a step down transformer which converts the high voltage output of the generator 12 to a relatively low voltage. This voltage is then rectified to provide a direct current which preferably is in the range of, e.g., 3.6–3.75 volts, which is the typical operating range of the electrolysis cell 14. In the event the supply voltage is direct current, the power rectifier 13 is by-passed, and the DC voltage stepped down to the desired voltage range by suitable means known in the art.

It should be understood that a low voltage high current generator, such as, for example, a homopolar generator, could be appropriately driven by a steam turbine to provide current to the electrolysis cell 14. The desired voltage, i.e., 3.6–3.75 volts at the desired current level, depending on the size of the cell 14, is fed to the chlorine-sodium hydroxide electrolysis cell 14. At the same time saline water, or brine, is pumped into the cell. Electrolysis then takes place and chlorine is formed at the cell anode while hydrogen is released at the cell cathode, leaving a 10–15% sodium hydroxide solution and a 10–15% sodium chloride solution in the cell liquor. Accordingly, 70 to 80% of the saline water is converted to hydrogen and chlorine. The chlorine is compressed into storage tank 15. The hydrogen is compressed into storage tank 16. The hydrogen and chlorine are then fed to the solar reactor 32 at a controlled rate by suitable means known in the art. The sodium hydroxide and sodium chloride are fed into process storage tank 17, then used in other processes as desired. The hydrogen is fed into the solar reactor chamber 32 via tube 21. The chlorine is fed into the solar reactor chamber 32 via tube 22. Atmospheric oxygen is fed into the solar reactor chamber 32 from storage tank 33 via tube 23. Water is fed from chlorine treated water storage tank 34 via tube 26 into the heat exchanger tubes 25. Intensified solar rays are directed through sight glass 27, illustrated in FIGS. 1 and 2, into the reactor chamber 32 onto the conical reflector 24 which disperses the solar rays onto the surface of the exchanger tubes 25. The solar rays bring about a reaction of controlled explosive violence between the hydrogen and chlorine, emitting conductive, convective, compressive, and infrared heat. The heat is absorbed by the exchanger tubes 25, vaporizing the water and discharging steam via tube 30 which is then fed to power generator 12 to drive power turbines. Pressure relief valve 29 provides a means for releasing excessive pressures that build up in the reactor chamber 32. The hydrogen chloride exhausted by valve 29 is channeled to an appropriate mechanism for converting the hydrogen chloride to acid or other appropriate compounds as desired.

While the preferred embodiment of applicant's invention has been disclosed, it would be appreciated that there may be other alternate embodiments of applicants' invention which fall within the spirit and scope of the invention as defined by the appended claims.

What is claimed is:

1. A method of storing electrical energy and converting said stored energy to kinetic energy comprising the steps of:
    generating an electrical current,
    conducting said electrical current to an electrolysis cell,
    generating chlorine and hydrogen in an electrolysis cell, said generating step being sustained by said generated electrical current,
    controllably coupling said chlorine and hydrogen to a chamber of a solar reactor,
    directing electromagnetic radiation into said chamber to thereby exothermically react said hydrogen and chlorine to generate heat therein,
    conducting a fluid proximate the surface of said chamber, and
    absorbing said heat by said fluid as said fluid is conducted with respect to said chamber thereby increasing the kinetic energy of said fluid.
2. The method of claim 1 wherein said fluid is water.
3. The method of claim 2 wherein said electromagnetic energy is solar radiation.
4. The method of claim 1 further comprising the steps of concentrating said electromagnetic radiation, directing said concentrated radiation in said chamber so that said radiation is dispersed throughout said chamber.
5. The method of claim 4 further comprising the step of venting exhaust gases from said chamber when the internal pressure in said chamber reaches a predetermined level.
6. The method of claim 5 further comprising the step of coupling oxygen into said chamber.
7. The method of claim 5 wherein said fluid is conducted proximate the surface of said chamber by tungstencarbide tubing.
8. The method of claim 5 wherein said directing step comprises the steps of focusing said radiation onto a reflective surface, and reflecting said focussed radiation into said chamber.

9. The method of claim 5 wherein said fluid is conducted through carbide about the internal periphery of said chamber.

10. An apparatus for storing electrical energy and converting said stored energy to kinetic energy comprising:
- means for generating an electrical current,
- means for conducting said electrical current to an electrolysis cell,
- means for generating chlorine and hydrogen in said electrolysis cell, said hydrogen and chlorine generating means being energized by said electrical current,
- means for controllably coupling said chlorine and hydrogen to a chamber of a solar reactor,
- means for directing electromagnetic radiation into said chamber to thereby exothermically react said hydrogen and chlorine to generate heat therein,
- means for conducting a fluid proximate the internal surface of said chamber, and
- means for conducting said fluid away from said chamber after said fluid has absorbed heat generated by said exothermic reaction.

11. The apparatus of claim 10 wherein said fluid is water.

12. The apparatus of claim 11 wherein said electromagnetic radiation is solar radiation.

13. The apparatus of claim 12 further comprising means for concentrating said electromagnetic radiation, means for directing said concentrated radiation into said chamber, and means for dispersing said radiation in said chamber so that said radiation is dispersed throughout said chamber.

14. The apparatus of claim 13 wherein said means for directing said radiation into said chamber further comprises means for focussing said radiation onto a first reflective surfaces, and means for reflecting said focussed radiation into said chamber.

15. The apparatus of claim 14 wherein said fluid is conducted through a layer of silicon carbide positioned about the internal periphery of said chamber.

16. The apparatus of claim 14 wherein said fluid is conducted proximate the surface of said chamber by tungsten-carbide tubing.

* * * * *